US011415294B2

(12) United States Patent
Hansen

(10) Patent No.: US 11,415,294 B2
(45) Date of Patent: Aug. 16, 2022

(54) LIGHT SOURCE INCLUDING MODIFIED MULTI-LAYER LENSES

(71) Applicant: Flex-N-Gate Advanced Product Development, LLC, Tecumeseh (CA)

(72) Inventor: David Bjarne Hansen, Grand Rapids, MI (US)

(73) Assignee: Flex-N-Gate Advanced Product Development, LLC, Tecumseh (CA)

( * ) Notice: Subject to any disclaimer, the term of this patent is extended or adjusted under 35 U.S.C. 154(b) by 0 days.

(21) Appl. No.: 17/033,055

(22) Filed: Sep. 25, 2020

(65) Prior Publication Data

US 2021/0095830 A1  Apr. 1, 2021

Related U.S. Application Data

(60) Provisional application No. 62/906,380, filed on Sep. 26, 2019.

(51) Int. Cl.
*F21S 43/50* (2018.01)
*F21S 43/14* (2018.01)
*F21S 43/40* (2018.01)
*F21S 43/20* (2018.01)
*F21S 43/245* (2018.01)
*F21W 104/00* (2018.01)
*F21Y 115/10* (2016.01)

(52) U.S. Cl.
CPC ............. *F21S 43/50* (2018.01); *F21S 43/14* (2018.01); *F21S 43/245* (2018.01); *F21S 43/26* (2018.01); *F21S 43/40* (2018.01); *F21W 2104/00* (2018.01); *F21Y 2115/10* (2016.08)

(58) Field of Classification Search
CPC .. F21S 43/40; F21S 43/14; F21S 43/26; F21S 43/50; F21S 43/245; F21W 2104/00; G09F 13/044
See application file for complete search history.

(56) References Cited

U.S. PATENT DOCUMENTS

| 4,443,832 | A | * | 4/1984 | Kanamori | B60Q 1/26 |
| | | | | | 362/311.13 |
| 4,603,065 | A | | 7/1986 | Mori et al. | |
| 5,249,104 | A | * | 9/1993 | Mizobe | G02B 6/0018 |
| | | | | | 362/327 |
| 10,293,761 | B2 | * | 5/2019 | Topart | B60R 13/02 |
| 11,235,699 | B2 | * | 2/2022 | Sobecki | B60Q 1/2669 |
| 2008/0068857 | A1 | * | 3/2008 | Meinke | B60Q 1/2669 |
| | | | | | 362/546 |

(Continued)

FOREIGN PATENT DOCUMENTS

KR 20040010868 A 5/2004
KR 20060019158 A 3/2006

(Continued)

OTHER PUBLICATIONS

PCT Patent Application No. PCT/US2020/052793 International Search Report and Written Opinion dated Nov. 18, 2020.

*Primary Examiner* — Erin Kryukova
(74) *Attorney, Agent, or Firm* — Erise IP, P.A.

(57) ABSTRACT

Disclosed is a multi-layer lens arrangement for a vehicle light. The lenses include printed ink or other deposited materials at each level of lens, and can, in some versions, create a three-dimensional effect for a graphic.

17 Claims, 5 Drawing Sheets

(56) References Cited

U.S. PATENT DOCUMENTS

2014/0247614 A1* 9/2014 Roberts .............. B60Q 1/2615
                                                    362/509
2017/0043709 A1* 2/2017 Dellock .............. B60R 13/005
2019/0219746 A1   7/2019 Dellock et al.
2020/0391657 A1* 12/2020 Kindl ................. F21S 43/241

FOREIGN PATENT DOCUMENTS

TW            M544436 U      7/2017
WO    WO-2016190702 A1 * 12/2016  .......... B60Q 1/0058

* cited by examiner

LIGHT SOURCE INCLUDING MODIFIED MULTI-LAYER LENSES

CROSS-REFERENCE TO RELATED APPLICATIONS

This application claims the benefit of U.S. Provisional Application Ser. No. 62/906,380 filed Sep. 26, 2019, the entire contents of which are herein incorporated herein by reference.

BACKGROUND OF THE INVENTION

1. Field

The disclosed embodiments relate generally to the field of automotive exteriors. More specifically, the field of automobile lighting and/or fascia systems and arrangements.

2. Description of the Related Art

Vehicle exteriors often include both functional and ornamental features. With respect to lighting, some lighting arrangements are primarily functional, e.g., headlights and signal lights. These features, however, can also include ornamental aspects, e.g., may be designed for appealing appearance in addition to performance.

Other exterior features unrelated to lighting, e.g., fascias, can be decorated ornamentally, or designed to conform to an overall vehicle appearance, or to accomplish aerodynamic schemes. Most commonly, fascia panels are implemented into the front and rear of a vehicle. The facias can be incorporated at, e.g., the vehicle's headlamp area, grill, bumper, side paneling, into or near a taillight arrangement, as well as other locations.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In one embodiment, a vehicle fascia lamp unit is disclosed. The unit has a light source; a first inner lens spaced away from and in front of and receiving light from the light source; a second outer lens spaced apart from the first inner lens, and receiving light transmitted through the first lens, and then directing the light out of the fascia lamp; an inner surface of the first lens, the inner surface of the first lens facing the light source, the inner surface including an occluding material deposit on a first portion of the inner surface, the inner surface of the first lens also having a translucent material deposit, the translucent material deposit being at distinct location relative to the occluding material deposit on the inner surface of the first lens; an outer surface of the first lens, the outer surface of the first lens including an first light modifying material deposit at an outer surface location; the second outer lens having an inner surface, the inner surface of the second outer lens having a plurality of material deposits, each deposit in the plurality having a different light-modifying characteristic than the other material deposits of the plurality of material deposits areas on the outer lens; an outer side of the second outer lens, the outer side of the second outer lens having a plurality of material deposits, each material deposit area in the plurality of deposits on the outer side of the second lens having a different light-modifying characteristic than the other material deposits areas in the plurality; and a light output transmitted from the second outer lens into an environment outside a vehicle, the light output achieving an ornamental effect. In some embodiments the material deposits are an ink or paint.

In some embodiments, the translucent material deposit on the inner surface of the first lens is located inside the occluding material deposit on the inner surface of the first lens, the occluding deposited material forming bands above and below the translucent material on the inner surface of the first lens. In other embodiments the outer surface of the first lens includes a second light-modifying material deposit. In still further embodiments, the outer surface of the first lens includes a third light-modifying material deposit. In other embodiments, the first light-modifying material deposit on the outer surface of the first lens includes second and third light-modifying material deposits.

In some versions, the unit is configured for installation into a pocket created in a vehicle exterior configuration, e.g., displays a three-dimensional optionally multicolor rendering including indicia.

The unit can include LEDs aligned in the direction in which the deposits are extending. In embodiments, the LEDs are aligned along an edge of a light guide, and the light guide is backed with reflective material directing light through the first and second lenses. Alternatively, the LEDs are directed into a reflector to indirectly cause light to illuminate through the first and second lenses. In another embodiment, the plurality of LEDs are oriented into a plurality of rows behind the first and second lenses to directly cause light to illuminate through the first and second lenses.

In embodiments, a vehicle light is disclosed that has a light source configured to emit light in an outward direction; a first lens configured to modify at least some of the light emitted from the source using a first light-modifying substance applied at a location on an inner or an outer surface of the first lens, the first light-modifying substance covering at least a portion of the first lens; and a second lens, the second lens being configured to modify at least some of the light emitted from the source using one of: (i) the first light-modifying substance, and (ii) a different light-modifying substance applied onto a location on an inner or an outer side of the second lens, the second light-modifying substance covering at least a portion of the second lens. The first light-modifying substance can be an ink, printed matter, or a coating. Further, the light-modifying substance applied onto the location on the second lens can be comprised of a different substance (e.g., ink or printed matter), and the light is incorporated into a vehicle exterior design.

Other embodiments regard a lens arrangement for a vehicle light. The arrangement has: a first lens including a printed ink material on at least one of inner and outer surfaces of the first lens; a second lens spaced outward from the first lens, the second lens including printed ink material on at least one of inner and outer surfaces of the second lens; and the lens arrangement configured to create a three-dimensional effect.

BRIEF DESCRIPTION OF THE SEVERAL VIEWS OF THE DRAWINGS

Illustrative embodiments are described in detail below with reference to the attached drawing figures, which are incorporated by reference herein and wherein.

Figure 1:
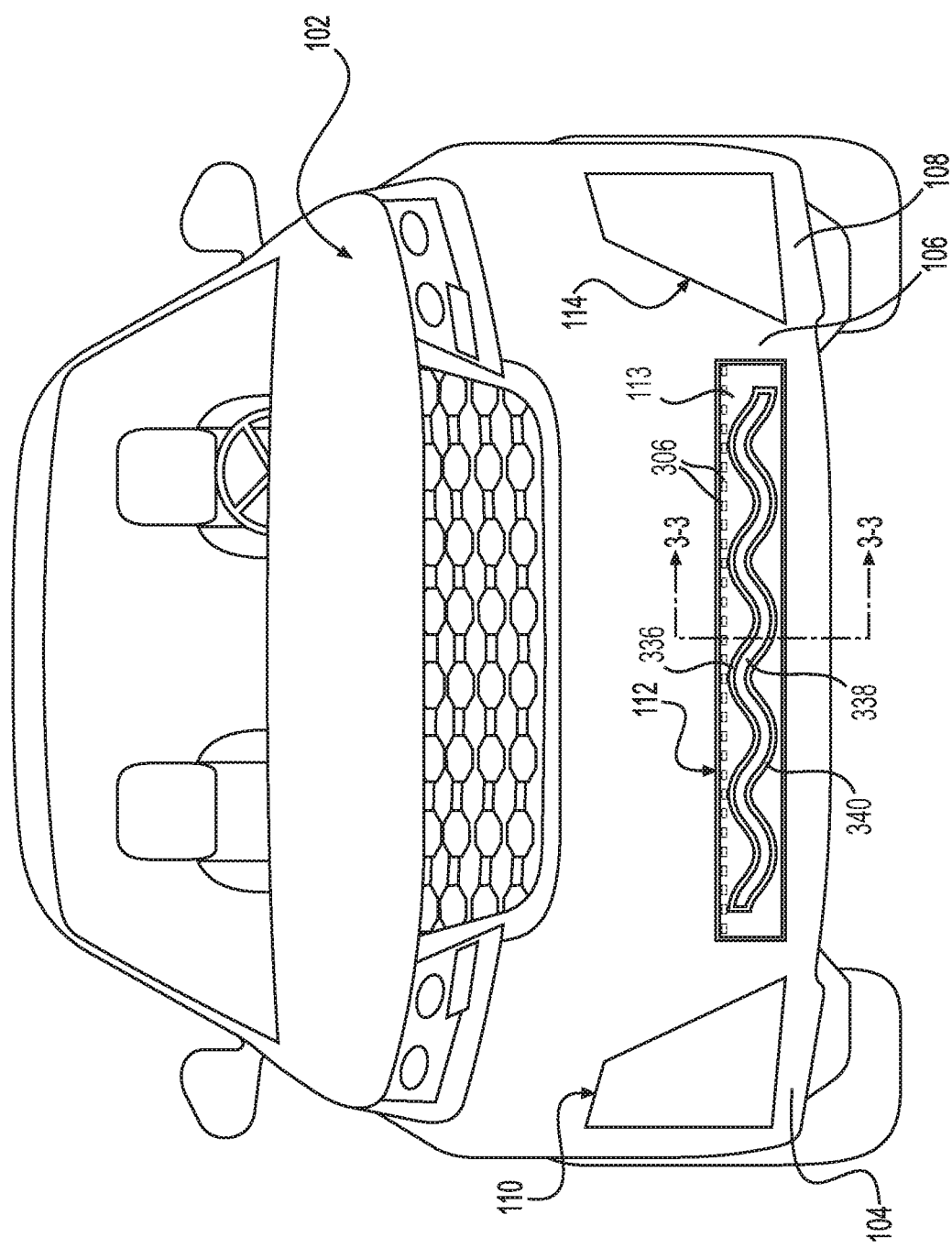
FIG. 1 shows a front end of a vehicle into which the disclosed light sources and methods and systems have been incorporated.

The drawing figures do not limit the invention to the specific embodiments disclosed and described herein. The drawings are not necessarily to scale, emphasis instead being placed upon clearly illustrating the principles of the invention.

DETAILED DESCRIPTION

Embodiments provide systems including a multi-lens lighting arrangement for vehicles used as a part of or as a replacement for a fascia.

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

An embodiment 100 shown in FIG. 1 includes a vehicle 102. The vehicle includes a passenger-side fascia section 104, a center fascia section 106, and a driver's-side facia section 108. In the disclosed embodiment, each of sections 104, 106, and 108 includes a first passenger-side module 110, a second central module 112, and a third drivers-side module 114, respectively. It should be understood that the embodiments disclosed herein should not be considered as limiting unless claimed. Those skilled in the art will recognize that broad concepts have and will be disclosed herein which could be embodied in numerous arrangements not shown.

Figure 2:
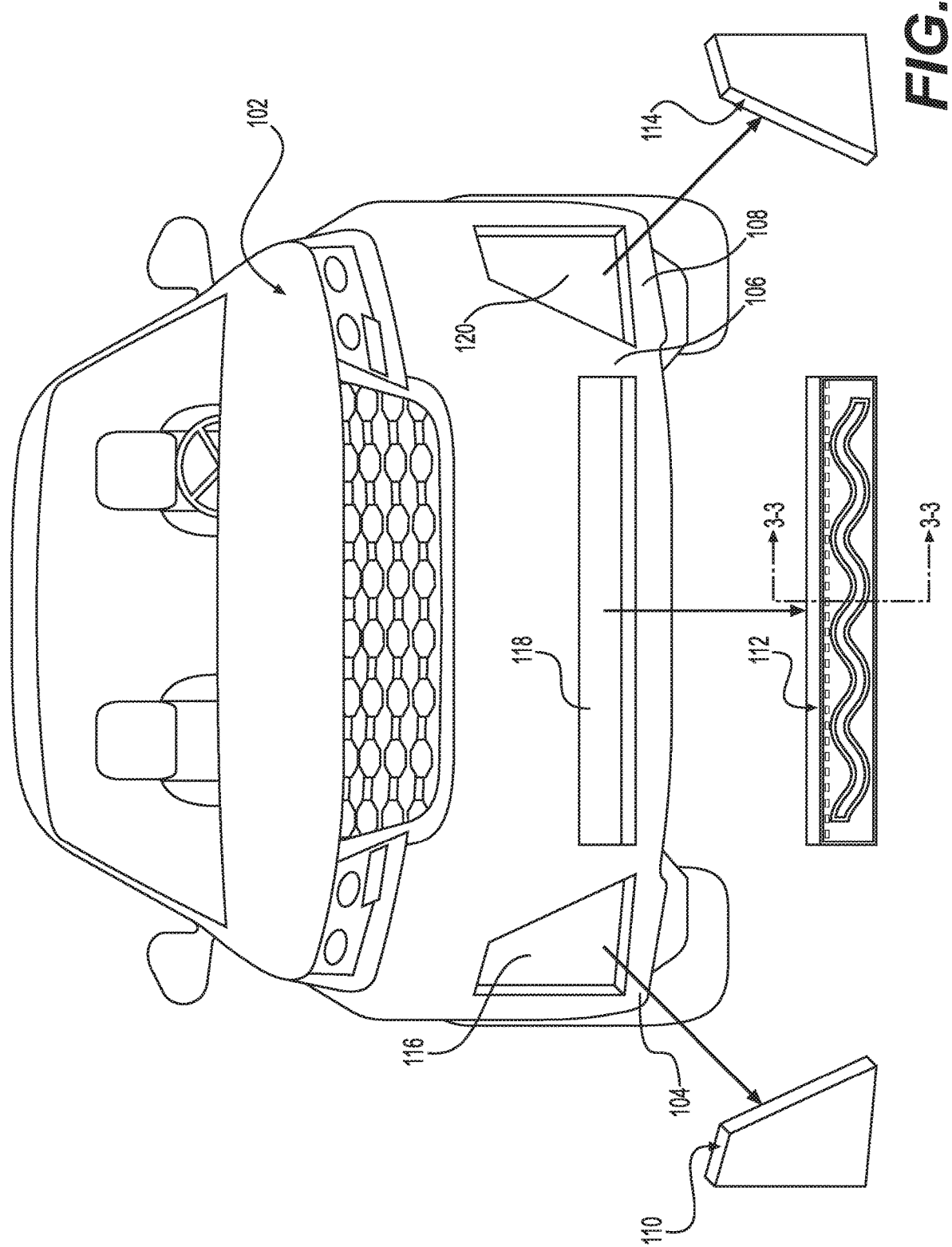
FIG. 2 shows the same view of FIG. 1A with the light sources removed.

Whereas FIG. 1 shows these modules as they appear when installed, and FIG. 2 shows the vehicle in a state where the modules are pulled out to reveal the pockets they are received into, e.g., pockets 116, 118, and 120.

In the disclosed embodiments, all of modules 110, 112, and 114 include top surfaces, side surfaces, and bottom surfaces. For example, looking at center module 112 in FIG. 2, in which it is removed, it can be seen that the module has upper housing wall 122, side walls 124 and 126, and a bottom wall 128 (not shown).

Figure 3:
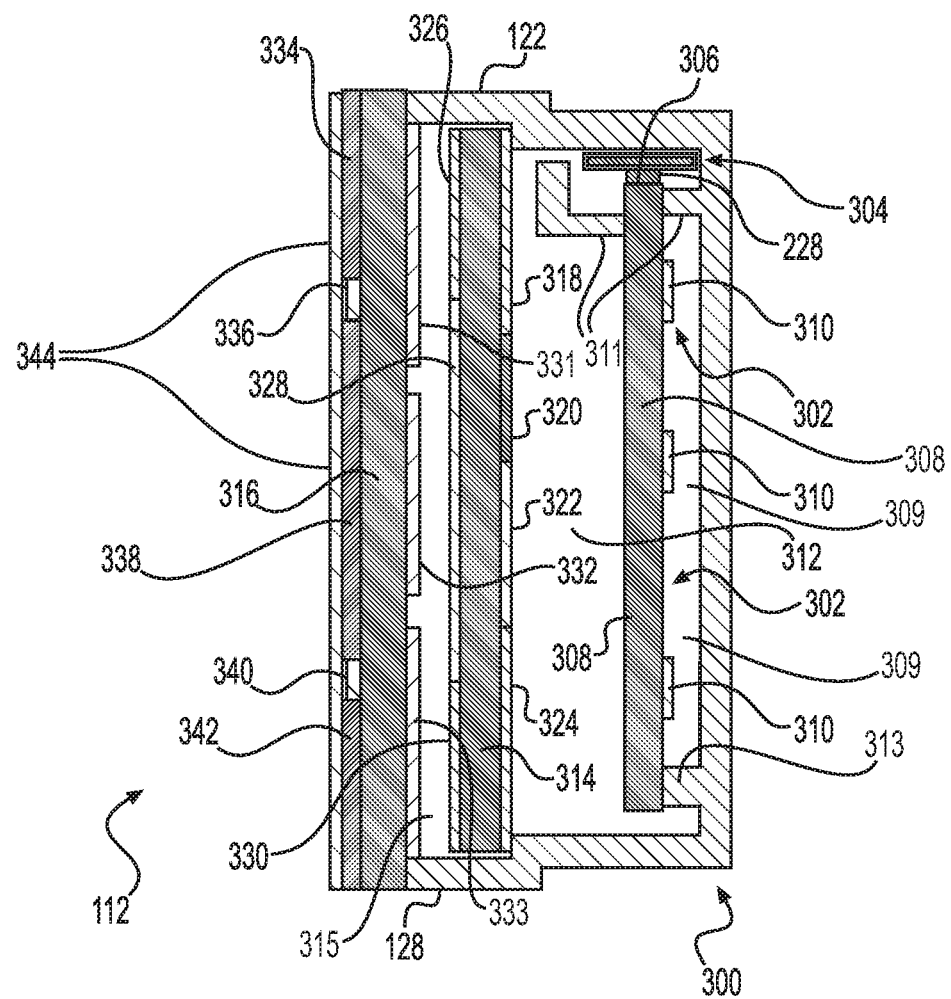
FIG. 3 shows a cross sectional view (Section 3-3) taken in FIG. 2 revealing light source internals for an embodiment incorporating either a light guide or a light pipe.

More details regarding the upper and bottom housing walls 122 and 128 can be seen in the cross section of FIG. 3. A plurality of LED packages 128 which provide light to the system can also be seen.

Referring to FIG. 3, it can be seen that these LEDs 228 are incorporated into a system 300. The light source 302 includes a PCB 304 onto which each of the in-line LEDs 228 (see FIG. 3) would go in and out of the page, and cannot all be seen in FIGS. 1 and 2, are mounted, controlled, and powered using known technologies. The light is extracted from the LED packages 304 (see also FIG. 1) into an edge 306 of a light guide plate 308. Reflective ink deposits 310 applied to the back of the light guide plate 308 (facing a first open space 309) serve to direct the light forward across an open chamber 312, into a first lens 314, then through a second open space 315, and then through a second lens 316 before leaving the housing.

As can be seen in the cross-section of FIG. 3, the inner and outer surfaces of the first lens 314 and second lens 316 have been modified by adding a paint or an ink in different locations, optionally on both sides. In embodiments, some of the light emitted from the source 302 is occluded or otherwise modified using a light-modifying substances applied in different locations on an inner and outer surfaces of each of the first and second lenses 314 and 316.

With respect to the first lens 314, the inner surface includes four areas onto which an ink or paint has been added. For example, in area 318 an opaque ink layer has been added for the purpose of blocking the emission of light therethrough. Immediately below that, in an area 320, a translucent ink has been added to modify the light, e.g., creating a desired color, decorative depiction, or other effect. A next area down 322 shows a lighter translucent ink with a color different than the one used in area 320. Immediately below that, area 324, in the FIG. 3 embodiment, is, like area 318, opaque, thus blocking light. The upper and lower opaque coatings 318 and 324 limit the light such that only the translucent colored/inked areas 320 and 322 allow for the passage of light. Although not evident from FIG. 3, each coated area (of areas 318, 320, 322, 324) extends into and out of the page in a uniform horizontal fashion, thus creating decorative indicia, rearward patterns supporting a three-dimensional design, or other configurations of diverse paints at different levels of the lens 308.

On the other (outer) side of the first lens 314, paints/inks have been applied to an area 326 as well as areas 328 and 330 in order to create (in combination of the coatings applied to the inner side, a three-dimensional effect when the device is illuminated, or not illuminated (e.g., in sunlight). Again here, although not evident from FIG. 3, each coated area (of areas 326, 328, and 330) extends into and out of the page in a uniform horizontal fashion, thus creating areas (e.g., bands or other shapes) of diversely deposited materials, e.g., paints at different levels of the lens 308.

Across the second gap/chamber 315, the second outer lens 316 includes three similar application areas 331, 332, and 333, each including a similar kind of paint (alternatively ink). Although these areas, in the disclosed embodiment, are identical or substantially similar coated stripes, those skilled in the art will recognize that each of areas 331, 332, and 333 could be painted differently depending on the desired effect. In the disclosed embodiment, the different areas have been made coated at different locations for the purpose of providing a three-dimensional layered effect, and colored appearance when being illuminated, or when not illuminated. On the outer side of lens 316, in the disclosed embodiments, three areas having different paint applications 334, 338, and 342 have been deposited, and these painted areas are spaced apart by again, differently painted areas 336 and 340. As can be seen in the FIG. 3 cross section, material deposition areas 336 and 340 are relatively short, and thus, serve to form curved bands which can be seen longitudinally in FIG. 1. Deposition area 338 forms a larger central curved band as can be seen in FIG. 1. FIG. 1 also shows that the uppermost and lowest material deposition areas 334 and 342 are used to create an illuminated different colored backing for the image represented by material deposition areas 336, 338, and 340.

The deposited material areas (painted/printed/coated) 334, 336, 338, 340, and 342 exist immediately underneath a transparent covering (or lens) 344. Because of this, the areas 334, 336, 338, 340, and 342 can be seen in FIGS. 1 and 2. The LEDs 306 for the FIG. 3 version are also shown in FIGS. 1-2 for the purpose of showing locations along the length, but have been brought out of the background because they would not be seen in the disclosed embodiment.

It should be noted, that any of areas 318, 320, 322, 324, 326, 328, 330, 331, 332, 333, 334, 336, 338, 340, and 342 could each include any variety or combination of ink, coatings, etc. of any light modifying characteristic for the purpose of creating any three-dimensional or other desired effect. One example of a three-dimensional effect which might be advantageously created is that of a three-dimensional rendering of a logo complete with colors, graphics, indicia, and other matter. Numerous other graphics, could, of course be implemented using the systems and methods described herein.

The embodiment of a sine-wave configuration disclosed in FIGS. 1-2 is only an example of a graphical effect, thus should not be considered limiting. It should also be understood that because of the various material depositions made on the first and second lenses 314 and 308 behind these foremost material deposition areas 334, 336, 338, 340, and 342, a sense of depth is given to the graphic, and a three-dimensional display can be created in embodiments.

Figure 4:
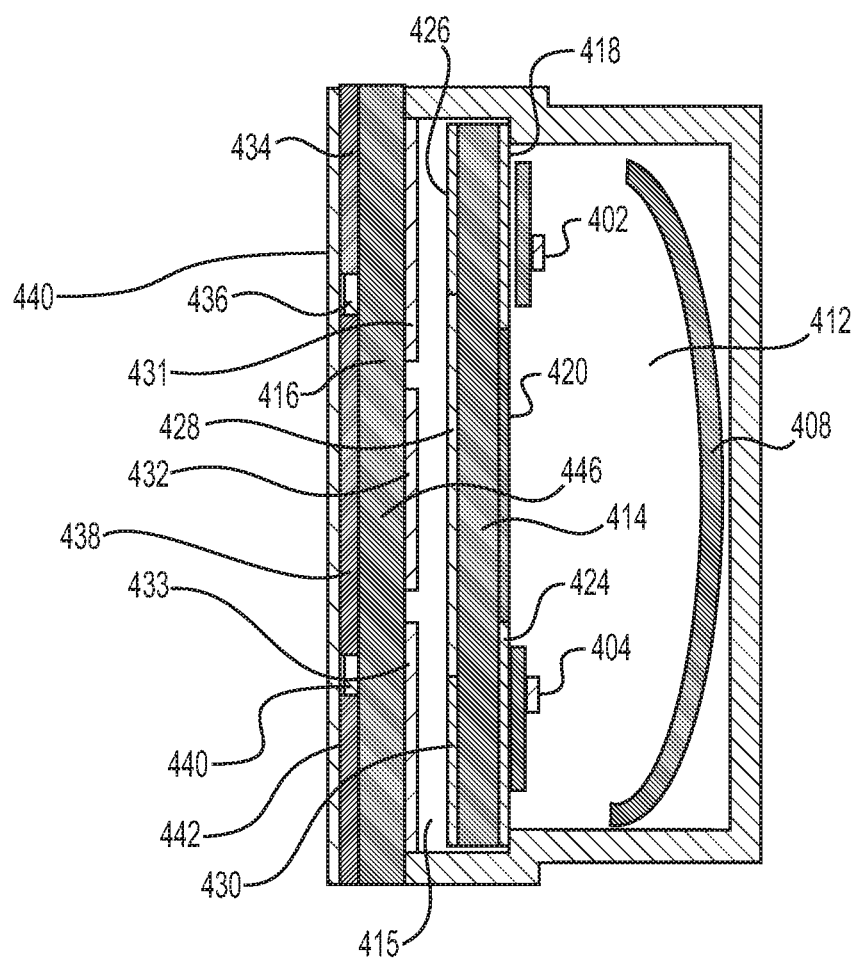
FIG. 4 shows an alternative embodiment having an indirect light source.

FIG. 4 discloses an alternative arrangement wherein a system of multi-layer lenses are subjected to indirect lighting. More specifically, referring to FIG. 4, it can be seen that a pair of LED rows, including upper row 402 and lower row 404, again, going into and out of the page, initially direct light into a reflector 408. Reflector 408 then directs light into a pair of lenses (in this embodiment a first lens 414, and a second lens 416) before leaving the housing.

With the FIG. 4 embodiment, like with the FIG. 3 embodiment, the inner and outer surfaces of the first lens 414 and second lens 416 have been modified by depositing a material, e.g., adding a paint, coatings, or an ink in different locations, optionally on both sides. More specifically, the lenses 414 and 416 have been inked, painted, coated, or otherwise modified in a plurality of areas, e.g., areas 418, 420, 422, 424, 426, 428, 430, 432, 434, 436, 438, 436, and 440, 442 existing on both the inside and outside of the lenses.

More specifically, the first lens 414 has an inner surface that includes four areas onto which an ink, paint, or other optically active material has been added. For example, in area 418 an opaque ink layer has been added for the purpose of blocking the emission of light therethrough. Immediately below that, in an area 420, a translucent ink has been added to modify the light, e.g., creating a desired color, decorative depiction, or other effect. A next area down 422 shows a lighter translucent ink with a color different than the one used in area 420. Immediately below that, an area 424, in the FIG. 4 embodiment is also opaque like area 418. Those skilled in the art will recognize that in embodiments, areas 418 and 424 may also be made reflective to increase light emission efficiency into the parabolic reflector 408. The opaque upper and lower coatings 418 and 424, because they block the light emitted, only allow light through the central horizontal band 420. Thus, only the translucent colored/inked area 420 allows for the passage of light. Although not evident from FIG. 4, each coated area (of occluded areas 418 and 424, and the translucent slit 420) extends into and out of the page in a uniform horizontal fashion, thus creating a single colored band of light passage at a vertical center (as seen in cross section) of the first lens 414.

On the other (outer) side of the first lens 414, paints/inks have been applied to an areas 426, 428, and 430 in order to create (in combination with the blocking coatings 418 and 424, and the translucent slit 420 applied to the inner side), a three-dimensional effect when the device is illuminated, or not illuminated (e.g., in sunlight). Again here, although not evident from FIG. 4, each coated area (of areas 426, 428, and 430) extends into and out of the page in a uniform horizontal fashion, thus creating bands of diverse paints at different levels of the first lens 414.

Across the second gap/chamber 415, the second outer lens 416 includes three similar inside application areas 431, 432, and 433, each including a similar kind of paint (alternatively ink). Bands 431 and 432 are separated by a differently painted upper band 436, and bands 432 and 433 are separated by a lower horizontal gap 440. Although these application areas 431, 432, and 433, in the disclosed embodiment, are identical or substantially similar coated stripes, those skilled in the art will recognize that each of areas 431, 432, and 433 could be painted differently depending on the desired effect. In the disclosed embodiment, the different areas have been made coated at different locations for the purpose of providing a three-dimensional layered effect, and colored appearance when being illuminated, or when not illuminated. On the outer side of lens 416, in the disclosed embodiments, three areas having different paint applications 434, 438, and 442 have been deposited, and these painted areas are spaced apart by differently painted areas 436 and 440.

It should be noted, that any of areas 418, 420, 422, 424, 426, 428, 430, 431, 432, 433, 434, 436, 438, 440, and 442 could each include any variety or combination of ink, coatings, etc. of any light modifying characteristic for the purpose of creating any three-dimensional or other desired effect. One example of a three-dimensional effect which might be advantageously created is that of a three-dimensional rendering of a logo complete with colors, graphics, indicia, and other matter.

Figure 5:
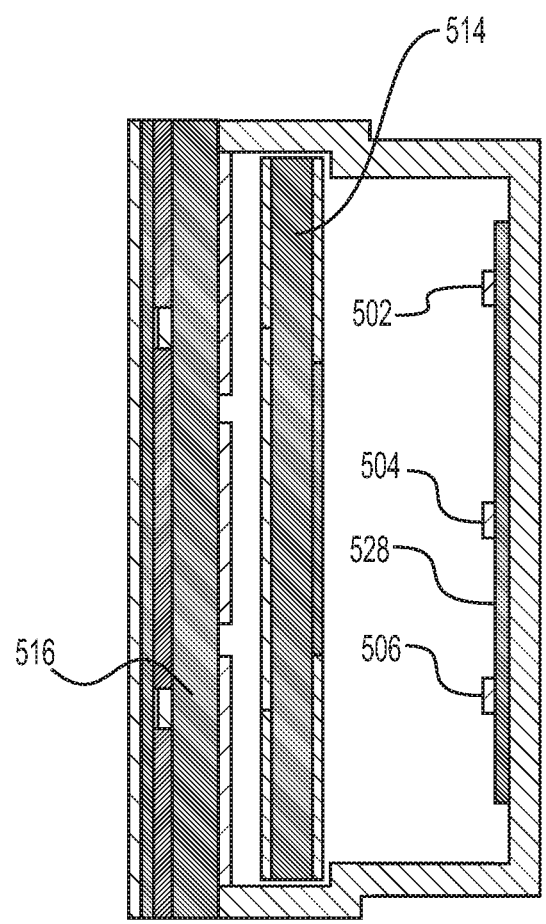
FIG. 5 shows an alternative embodiment wherein the light source includes a plurality of LEDs arranged to directly illuminate through the lenses.

FIG. 5 discloses an alternative arrangement wherein a system 500 includes multi-layer lenses 514 and 516 that are subjected to direct lighting by three horizontally-extending LED rows 502, 504, and 506 mounted on a common PCB 528. The rows are arranged to emit in a forward direction to illuminate lenses 514 and 516. The FIG. 5 embodiment includes substantially the same lens arrangement disclosed in FIGS. 3-4.

Combination of Features (A1) A vehicle fascia lamp unit may include: a light source; a first inner lens spaced away from and in front of and receiving light from the light source; a second outer lens spaced apart from the first inner lens, and receiving light transmitted through the first lens, and then directing the light out of the fascia lamp; an inner surface of the first lens, the inner surface of the first lens facing the light source, the inner surface including an occluding material deposit on a first portion of the inner surface, the inner surface of the first lens also having a translucent material deposit, the translucent material deposit being at distinct location relative to the occluding material deposit on the inner surface of the first lens; an outer surface of the first lens, the outer surface of the first lens including an first light modifying material deposit at an outer surface location; the second outer lens having an inner surface, the inner surface of the second outer lens having a plurality of material deposits, each deposit in the plurality having a different light-modifying characteristic than the other material deposits of the plurality of material deposits areas on the outer lens; an outer side of the second outer lens, the outer side of the second outer lens having a plurality of material deposits, each material deposit area in the plurality of deposits on the outer side of the second lens having a different light-modifying characteristic than the other material deposits areas in the plurality; and a light output transmitted from the second outer lens into an environment outside a vehicle, the light output achieving an ornamental effect.

(A2) The vehicle facia lamp unit of (A1) wherein one of more of: (i) the occluding material deposit and the translucent material deposit on the inner surface of the first lens; (ii) the first outer light-modifying material deposit on the outer surface location of the first lens; (iii) the plurality of light-modifying material deposits on the inner surface of the second lens; and (iv) the plurality of light-modifying material deposits on the outer surface of the second lens comprise an ink or paint.

(A3) The vehicle facia lamp unit of (A1) or (A2) wherein a plurality of: (i) the occluding material deposit and the translucent material deposit on the inner surface of the first lens; (ii) the first outer light-modifying material deposit on the outer surface of the first lens; (iii) the plurality of light-modifying material deposits on the inner surface of the second lens; and (iv) the plurality of light-modifying material deposits on the outer surface of the second lens comprise an ink or paint.

(A4) The vehicle facia lamp unit of any of (A1), (A2), or (A3) wherein all of: (i) the occluding material deposit and the translucent material deposit on the inner surface of the first lens; (ii) the first outer light-modifying material deposit on the outer surface of the first lens; (iii) the plurality of light-modifying material deposits on the inner surface of the second lens; and (iv) the plurality of light-modifying material deposits on the outer surface of the second lens comprise an ink or paint.

(A5) The vehicle fascia lamp unit of any of (A1-A4) wherein the translucent material deposit on the inner surface of the first lens is located inside the occluding material deposit on the inner surface of the first lens, the occluding deposited material forming bands above and below the translucent material on the inner surface of the first lens.

(A6) The vehicle fascia lamp unit of any of (A1-A5) wherein the outer surface of the first lens includes a second light-modifying material deposit.

(A7) The vehicle fascia lamp unit of any of (A1-A6) wherein the outer surface of the first lens includes a third light-modifying material deposit.

(A8) The vehicle fascia lamp unit of any of (A1-A7) wherein the first light-modifying material deposit on the outer surface of the first lens includes second and third light-modifying material deposits.

(A9) The vehicle fascia lamp unit of any of (A1-A8) wherein the unit is configured for installation into a pocket created in a vehicle exterior configuration.

(A10) The vehicle fascia lamp unit of any of (A1-A9) wherein the unit is configured to display a three-dimensional rendering.

(A11) The vehicle fascia lamp unit of any of (A1-A10) wherein the unit is configured to display a multicolor graphic.

(A12) The vehicle fascia lamp unit of any of (A1-A11) wherein the unit is configured to display indicia.

(A13) The vehicle fascia lamp unit of any of (A1-A12) wherein the light source includes a plurality of LEDs, the plurality of LEDs being aligned in the direction of each of the: (i) the translucent material deposit on the inner surface of the first lens; (ii) the first light-modifying material deposit on the outer surface of the first lens; (iii) the plurality of material deposits on the inside surface of the outer lens; and (iv) the plurality of material deposits on the outer side of the second lens.

(A14) The vehicle fascia lamp unit of any of (A1-A13) wherein the plurality of LEDs are aligned along an edge of a light guide, and the light guide is backed with reflective material directing light through the first and second lenses.

(A15) The vehicle fascia lamp unit of any of (A1-A13) wherein the plurality of LEDs are directed into a reflector to indirectly cause light to illuminate through the first and second lenses.

(A16) The vehicle fascia lamp unit of any of (A1-A15) wherein the plurality of LEDs are oriented into a plurality of rows behind the first and second lenses to directly cause light to illuminate through the first and second lenses.

(B1) A vehicle light comprising:
a light source configured to emit light in an outward direction;
a first lens configured to modify at least some of the light emitted from the source using a first light-modifying substance applied at a location on an inner or an outer surface of the first lens, the first light-modifying substance covering at least a portion of the first lens; and
a second lens, the second lens being configured to modify at least some of the light emitted from the source using one of: (i) the first light-modifying substance, and (ii) a different light-modifying substance applied onto a location on an inner or an outer side of the second lens, the second light-modifying substance covering at least a portion of the second lens.

(B2) The vehicle light of (B1) wherein the first light-modifying substance is an ink, printed matter, or a coating.

(B3) The vehicle light of either (B1) or (B2) wherein the light-modifying substance applied onto the location on the second lens is the different substance, and the different substance is one of ink or printed matter, the light being incorporated into a vehicle exterior design.

(C1) A lens arrangement for a vehicle light, the arrangement including: a first lens including a printed ink material on at least one of inner and outer surfaces of the first lens; a second lens spaced outward from the first lens, the second lens including printed ink material on at least one of inner and outer surfaces of the second lens; and the lens arrangement configured to create a three-dimensional effect.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A vehicle fascia lamp unit comprising:
a light source;
a first lens in front of and receiving light from the light source;
a second lens spaced apart from and outside the first lens, and receiving light transmitted through the first lens;
an inner surface of the first lens, the inner surface of the first lens facing the light source, the inner surface of the first lens including an occluding material deposit on a first portion of the inner surface of the first lens, the inner surface of the first lens also having a translucent material deposit, the translucent material deposit being at a location that is distinct from the occluding material deposit on the inner surface of the first lens;
an outer surface of the first lens, the outer surface of the first lens including a first light-modifying material deposit at an outer surface location;
the second lens having an inner surface, the inner surface of the second lens having a plurality of material deposits, each deposit in the plurality having different light-modifying characteristics;
an outer side of the second lens having a plurality of material deposits, each material deposit area in the plurality of deposits on the outer side of the second lens having different light-modifying characteristics; and
a light output transmitted from the second lens into an environment outside a vehicle, the light output provides an ornamental display visible to an observer in an environment outside the vehicle, the ornamental display being created by one or more of: (i) the occluding material deposit or the translucent material deposit on the inner surface of the first lens; (ii) the first light-modifying material deposit on the outer surface of the first lens; (iii) the plurality of material deposits on the inner surface of the second lens; and and (iv) the plurality of material deposits on the outer side of the second lens.

2. The vehicle fascia lamp unit of claim 1 wherein one or more of:
(i) the occluding material deposit and the translucent material deposit on the inner surface of the first lens;
(ii) the first light-modifying material deposit on the outer surface location of the first lens;
(iii) the plurality of light-modifying material deposits on the inner surface of the second lens; and
(iv) the plurality of light modifying material deposits on the outer surface of the second lens comprise an ink or paint.

3. The vehicle fascia lamp unit of claim 2 wherein a plurality of:
(i) the occluding material deposit and the translucent material deposit on the inner surface of the first lens;
(ii) the first light modifying material deposit on the outer surface of the first lens;
(iii) the plurality of light-modifying material deposits on the inner surface of the second lens; and (iv) the plurality of light modifying material deposits on the outer surface of the second lens comprise an ink or paint.

4. The vehicle fascia lamp unit of claim 3 wherein all of:
(i) the occluding material deposit and the translucent material deposit on the inner surface of the first lens;
(ii) the first light-modifying material deposit on the outer surface of the first lens;
(iii) the plurality of light-modifying material deposits on the inner surface of the second lens; and
(iv) the plurality of light modifying material deposits on the outer surface of the second lens comprise an ink or paint.

5. The vehicle fascia lamp unit of claim 1 wherein the translucent material deposit on the inner surface of the first lens is located inside the occluding material deposit on the inner surface of the first lens, the occluding material deposit forming bands above and below the translucent material deposit on the inner surface of the first lens.

6. The vehicle fascia lamp unit of claim 1 wherein the outer surface of the first lens includes a second light-modifying material deposit.

7. The vehicle fascia lamp unit of claim 6 wherein the outer surface of the first lens includes a third light-modifying material deposit.

8. The vehicle fascia lamp unit of claim 1 wherein the unit is configured for installation into a pocket created in a vehicle exterior configuration.

9. The vehicle fascia lamp unit of claim 1 wherein the unit is configured to display a three-dimensional rendering.

10. The vehicle fascia lamp unit of claim 9 wherein the unit is configured to display a multicolor graphic.

11. The vehicle fascia lamp unit of claim 10 wherein the unit is configured to display indicia.

12. The vehicle fascia lamp unit of claim 1 wherein a plurality of LEDs are oriented into a plurality of rows behind the first and second lenses to directly cause light to illuminate through the first and second lenses.

13. A vehicle light comprising:
a light source configured to emit light in an outward direction;
a first lens configured to modify at least some of the light emitted from the light source using a first light-modifying substance applied at a location on an inner or an outer surface of the first lens, the first light-modifying substance covering at least a portion of the first lens; and
a second lens, the second lens being configured to modify at least some of the light emitted from the light source using a second light-modifying substance applied onto a location on an outer surface of the second lens, the second light-modifying substance covering at least a portion of the second lens to form at least part of a graphic representation.

14. The vehicle light of claim 13 wherein the first light-modifying substance is an ink, printed matter, or a coating.

15. A vehicle light comprising:
a light source;
a first lens in front of the light source having an inner surface and an outer surface;
a second lens in front of the second lens having an inner surface and an outer surface;
one of a deposited translucent area or an opaque material area located on three or more of: (i) the inner surface of the first lens; (ii) the outer surface of the first lens; (iii) the inner surface of the second lens; and (iv) the outer surface of the second lens;

wherein the at least one of the translucent material area or the opaque material area deposited on at least three or more of (i) the inner surface of the first lens; (ii) the outer surface of the first lens; (iii) the inner surface of the second lens; and (iv) the outer surface of the second lens form a first lighting effect comprising an illuminated graphic illuminated graphic upon activation of the light source; and;

wherein the at least one of the deposited translucent area or the opaque material area on at least three or more of (i) the inner surface of the first lens; (ii) the outer surface of the first lens; (iii) the inner surface of the second lens; and (iv) the outer surface of the second lens create a second lighting effect different than the first lighting effect when the light source is not activated.

16. The vehicle light of claim 15 wherein the at least one of the deposited translucent area or the opaque material area are located on all of (i) the inner surface of the first lens; (ii) the outer surface of the first lens; (iii) the inner surface of the second lens; and (iv) the outer surface of the second lens.

17. The vehicle light of claim 16 wherein the illuminated graphic is configured to comprise indicia.

\* \* \* \* \*